(12) United States Patent
Narayan et al.

(10) Patent No.: US 8,396,965 B2
(45) Date of Patent: Mar. 12, 2013

(54) SYSTEM AND METHOD TO ENHANCE USER PRESENCE MANAGEMENT TO ENABLE THE FEDERATION OF RICH MEDIA SESSIONS

(75) Inventors: Pramodh D. Narayan, Naperville, IL (US); Dana M. Norwood, Marietta, GA (US); Sri Ramanathan, Lutz, FL (US); Matthew A. Terry, Celebration, FL (US); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/455,858

(22) Filed: Apr. 25, 2012

(65) Prior Publication Data
US 2012/0209995 A1    Aug. 16, 2012

Related U.S. Application Data

(63) Continuation of application No. 12/492,759, filed on Jun. 26, 2009, now Pat. No. 8,266,226.

(51) Int. Cl.
  *G06F 15/173* (2006.01)
(52) U.S. Cl. ........................ 709/224; 709/206
(58) Field of Classification Search ............ 709/206, 709/224; 705/26
See application file for complete search history.

(56) References Cited

U.S. PATENT DOCUMENTS

| | | | |
|---|---|---|---|
| 7,154,409 B2 | 12/2006 | Mohammed et al. | |
| 7,359,496 B2 | 4/2008 | Qian et al. | |
| 7,860,898 B1 * | 12/2010 | Moranta et al. | 707/803 |
| 2003/0023690 A1 | 1/2003 | Lohtia | |
| 2005/0004985 A1 * | 1/2005 | Stochosky | 709/205 |
| 2005/0210113 A1 | 9/2005 | Kasuga et al. | |
| 2005/0262195 A1 | 11/2005 | Ono et al. | |
| 2006/0149637 A1 * | 7/2006 | Zellner et al. | 705/26 |
| 2007/0071209 A1 | 3/2007 | Horvitz et al. | |
| 2007/0255577 A1 | 11/2007 | Rao et al. | |
| 2007/0266076 A1 | 11/2007 | Cox et al. | |
| 2008/0059493 A1 | 3/2008 | Blohm | |
| 2008/0082668 A1 | 4/2008 | Yoakum et al. | |
| 2008/0088206 A1 | 4/2008 | Watanabe | |
| 2008/0092233 A1 | 4/2008 | Tian et al. | |
| 2009/0253409 A1 * | 10/2009 | Slavov et al. | 455/411 |

OTHER PUBLICATIONS

Notice of Allowance dated May 8, 2012 for U.S. Appl. No. 12/492,759.

* cited by examiner

*Primary Examiner* — Wing F Chan
*Assistant Examiner* — Hitesh Patel
(74) *Attorney, Agent, or Firm* — Matthew Chung; Roberts Mlotkowski Safran & Cole, P.C.

(57) ABSTRACT

A method and system is provided to enhance user presence management to enable the federation of rich media sessions. The method is implemented on a system and includes a presence manager server receiving a notification of user activity of one or more users taking place on one or more participating ecosystem sites in a participant ecosystem. The method further includes processing the user activity of the one or more users based on preferences of the one or more participating ecosystem sites established during a registration process and stored in a preference repository. The method further includes sending a notification of the user activity of the one or more users to the one or more participating ecosystem sites in the participant ecosystem to enable the participating ecosystem sites to at least one of communicate the user activity of the one or more users to one or more users and maintain a session of the one or more users.

21 Claims, 4 Drawing Sheets

SYSTEM AND METHOD TO ENHANCE USER PRESENCE MANAGEMENT TO ENABLE THE FEDERATION OF RICH MEDIA SESSIONS

CROSS REFERENCE TO RELATED APPLICATION

This application is a continuation application of Ser. No. 12/492,759, filed Jun. 26, 2009, now U.S. Pat. No. 8,266,226 issued on Sep. 11, 2012, the contents of which are incorporated herein by reference in their entirety.

FIELD OF THE INVENTION

The present invention generally relates to presence management, and more particularly, to methods and systems for enhancing user presence management to enable the federation of rich content sessions.

BACKGROUND

Web users use Internet browsers to visit different web sites of their choice to access, view and share content, communicate and collaborate with one another, conduct Internet searches, and buy products online. The popularity of web portals is driven by the ability to integrate multiple sources of information and content into a unified user experience. Rich content and capabilities continue to evolve on the web, and portal operators, who continuously struggle to integrate these latest technologies into portals, are constantly faced with the compromise of linking the user out of the portal to lower cost and increase speed to market.

When a user's experience is comprised of multiple disparate applications, complexities arise when dealing with session management. For example, in some web sessions, the user is prone to receiving a session timeout error screen when clicking between applications. Additionally, as discussed below, these different applications cannot easily share information to enhance the user experience.

In many web portals, the user enters the main portal application before accessing the other services available on the portal. Also, to interact with certain applications, the user would typically need to leave the main portal. Unfortunately, this results in session management concerns. For example, in an ideal implementation the user can access all content, services, and functionality through portlets and would not need to access any other web application. Portal operators, however, cannot always achieve this ideal implementation because applications do not typically offer standardized portlets that can be integrated into the main portal. Instead, each application is only exposed as a standalone application. In this typical case, the portal will provide an introductory portlet that describes the application and will offer a hyperlink to the full application server.

One of many issues implicated in this scenario is session management timeout for each of these applications. Although several products exist to enable single sign-on entry to give access to multiple applications, such products do not address enterprise session management that can keep all application sessions in the set synchronized. For example, after a user enters a portal and clicks on a link that takes the user to an application, the portal server is unaware of the user's activity on that other application. For this reason, a user's session may expire while using the application, thereby resulting in session expiration before the user links back to the main portal. Although portal operators resort to setting the portal session timeout to a very high number and, in the event of timeout, resort to rebuilding the session, these are not ideal solutions.

A corollary issue relates to loss of a common session. In a typical application, different components can share information about the products and services with which the user is interacting. This allows, for instance, an MP3 commerce component to automatically offer the soundtrack for a movie that the user is previewing in another component. In the absence of a common session, however, the necessary information is not shared and is lost upon session timeout.

Accordingly, there exists a need in the art to overcome the deficiencies and limitations described hereinabove.

BRIEF SUMMARY

In an aspect of the invention, a method comprises a presence manager server receiving a notification of user activity of one or more users taking place on one or more participating ecosystem sites in a participant ecosystem. The method also comprises processing the user activity of the one or more users based on preferences of the one or more participating ecosystem sites established during a registration process and stored in a preference repository. The method further comprises sending a notification of the user activity of the one or more users to the one or more participating ecosystem sites in the participant ecosystem to enable the participating ecosystem sites to at least one of communicate the user activity of the one or more users to one or more users and maintain a session of the one or more users.

In another aspect of the invention, a system for enabling the federation of rich content sessions comprises a preference repository and a presence manager server. The preference repository is operable to receive registration and preference information of one or more participating ecosystem sites, user activity information, and user activity requests received from the one or more participating ecosystem sites. The presence manager server is operable to receive from the one or more participating ecosystem sites in a participant ecosystem a notification of user activity of one or more users taking place on the one or more participating ecosystem sites. The presence manager is also operable to process the user activity based on the preferences of the one or more participating ecosystem sites established during a registration process and stored on a preference repository. The presence manager server is further operable to send a notification of the user activity to the one or more participating ecosystem sites in the participant ecosystem to enable the one or more participating ecosystem sites to at least one of communicate the user activity to the one or more users and maintain a session of the one or more users. Each participating ecosystem site is operable to execute an application. Each application contains an application profile that describes the application.

In yet another aspect of the invention, a computer program product comprises a computer usable storage medium having readable program code tangibly embodied in the storage medium. The computer program product is operable to receive registration and preference information of one or more participating ecosystem sites, user activity information of a user, and user activity requests from the one or more participating ecosystem sites in a participant ecosystem. The computer program product is further operable to receive a notification of user activity of the one or more users taking place on the one or more participating ecosystem sites from the one or more participating ecosystem sites in the participant ecosystem. The computer program product is also operable to process the user activity based on the preferences of the one or more participating ecosystem sites established during a registration process and stored on a repository. The computer program product is further operable to send a notification of the user activity to the one or more participating ecosystem sites in the participant ecosystem to enable the participating ecosystem sites to at least one of communicate the user activity to a plurality of other users and maintain a session of the one or more users.

In yet another aspect of the invention, a computer system for enabling the federation of rich content sessions comprises a CPU, a computer readable memory and a computer readable storage media. The computer system also comprises first program instructions to process requests for user activity information and second program instructions to send the user activity information to one or more participating ecosystem sites. The first and second program instructions are stored on the computer readable storage media for execution by the CPU via the computer readable memory.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to presence management, and more particularly, to methods and systems for enhancing user presence management to enable the federation of rich content sessions. Presence is defined as the ability to determine a user's status on a telecommunications network channel along with the availability and preference of the subscriber to communicate on that channel, such as, for example, an instant messaging session. Additionally, in an IMS (IP Multimedia Subsystem) context, presence is maintained in a "presence server," which is a SIP A/S (Application Server) that maintains network based presence for telecommunications purposes. As such, all entities that communicate with an IMS compliant presence server have to be SIP aware.

Advantageously, the present invention extends existing presence capabilities by capturing specifics about what the user is doing online, such as, for example, what applications, media and other content the user is accessing. Additionally, the invention exposes this extended information to approved users in order to communicate specific media, products and/or services other users may be using during the session. This could, for example, create enriched cross sell opportunities. Moreover, the invention enables a related application set to use the extended presence information to synchronize session activity and share user information to realize a federated session experience. For example, if a user logs onto Portal A and moves to Website B from Portal A, Portal A will be notified of session activity taking place on Website B. Based on this information, Portal A will not time out the session, as the user is still active on Website B, which may be a related site. Finally, the invention securely exposes the extended presence information as a monetized service to approved applications in order to leverage both the user's and user's friends' online activities to offer richer user experience.

The present invention exposes rich media sessions based on the concept of "deep presence" across all related applications in order to overcome a lack of a shared application server session. Deep presence refers to comprehensive awareness of the presence of users and their activities within an ecosystem. More specifically, the invention provides a mechanism for revealing Internet session-based information to trusted social network members in a "cross domain" manner. In embodiments, the present invention leverages a common identity backplane and centrally enforces black lists and white lists to protect privacy.

The federated rich content session enabled by the present invention provides a standard that allows the different applications in an application set to share information about the user as well as the activity of the user. In this way, the federated rich content session enhances the overall user experience by extending the capabilities of the application set.

To achieve a federated session experience, the invention enables a related application set to use the extended presence information to synchronize session activity and share user information. In embodiments, the invention enhances existing user presence management standards to include, not only "available" and/or "away" status, but also what applications the user is using as well as other associated information, such as, for example, user interaction with a media such as a movie, song, or other feature.

In implementations, the present invention solves many practical issues that have otherwise curtailed the realization of allowing different applications to share user information. For example, according to aspects of the invention, a participating ecosystem (shared session application set) groups a set of disconnected applications running on participating ecosystem sites to enable them to share user activity and/or session information between and among other participating ecosystem sites, thereby allowing a federated session experience across the application set in the ecosystem. For example, in embodiments, all applications in an application set may share information relating to the online activities of a user who has used or is using any other application in the application set based on preferences established by both users and participating ecosystem sites in the ecosystem.

In embodiments, this concept of a federated session may be extended outside a set of related applications to support any application that wants (and is allowed by the user) to receive information related to the user's activity, thereby allowing the application to offer an enriched user experience. This presence information, for example, may be owned by the service provider, maintained on existing presence servers, and offered as a service to third party application providers.

In embodiments, the invention leverages existing authentication baseline mechanisms for federating identities such as the Open ID standard. It extends the authorization model to allow an application to access only certain presence information, as specified by the service provider based on level of service, or as specified by the user based on permissions granted.

In further embodiments, the invention also leverages existing white list concepts to allow a user to give an application or application domain permission to expose their presence to any interested party regardless of the status of that party. The motivation for granting such a privilege could be, for example, discounts on products and services. In embodiments, the invention further extends the typical white list paradigm to white list a user's "buddy" list to automatically allow all of a user's friends, or buddies, to access that user's presence information. This may be helpful in sharing a user's activities on sites that offer product recommendations with those on the user's white list.

In embodiments, the present invention also leverages the concept of blacklists to allow a user to block the sharing of information to an entire application domain or a specific user across all application domains. In implementations, the invention may additionally allow the notion of blacklisting a user and all associated users on a user's buddy list.

In embodiments, the present invention leverages publish and subscription capabilities to extend the existing notion of presence, which includes a status message where updates are viewable in connected applications. This extends functionality to support a subscription and notification-based model, where participating entities, or sites, both feed user presence information and register to be notified about changes from other entities participating in the ecosystem. These notifications could include, for example, the ability to immediately enforce any change in user preferences, including the addition or revocation of permissions.

EXEMPLARY SYSTEM ENVIRONMENT AND INFRASTRUCTURE

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible storage medium of expression having computer-usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium may include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
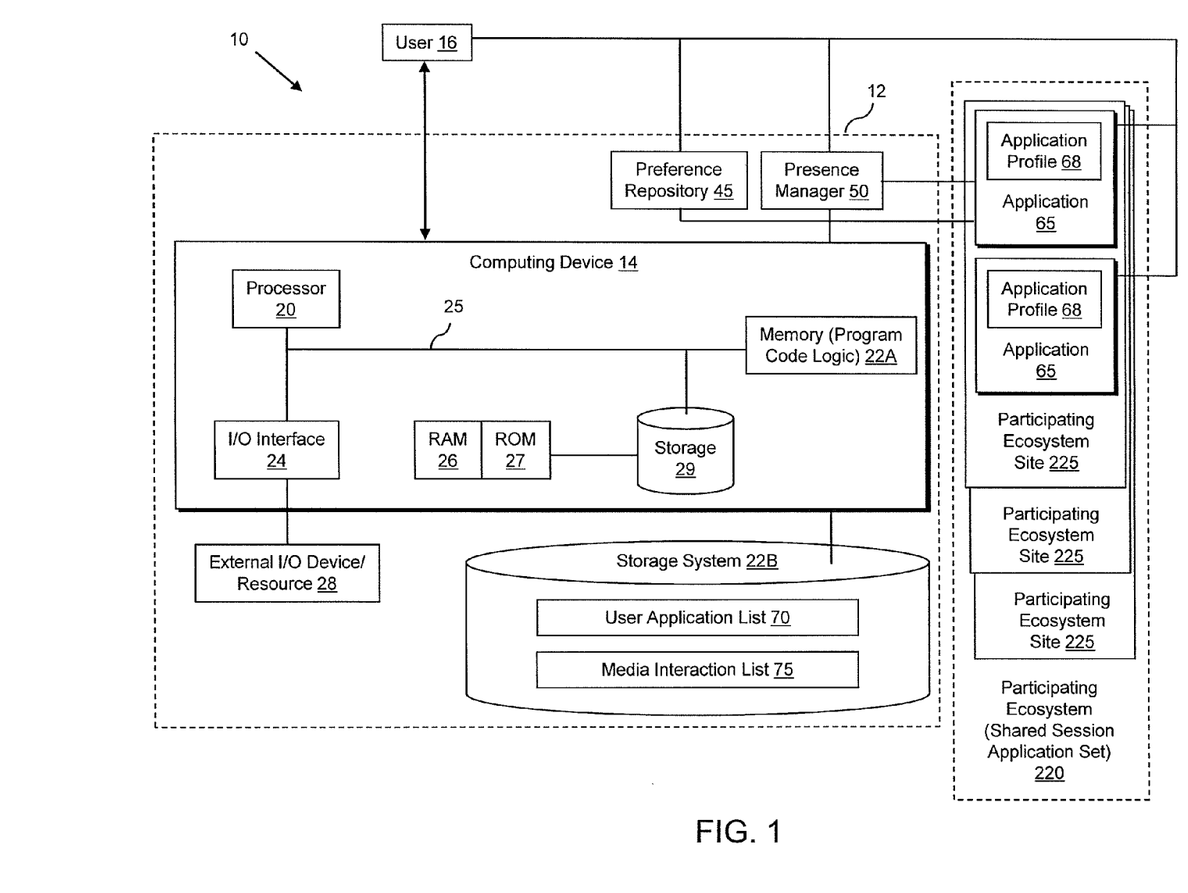
FIG. 1 shows an illustrative environment for implementing processes in accordance with the present invention.

FIG. 1 shows an illustrative environment 10 for managing the processes in accordance with the present invention. To this extent, the environment 10 includes a computer infrastructure 12 that may perform the processes described herein such as, for example, processing requests for registration, maintaining presence information, and determining what presence information may be disclosed to which parties. In particular, the computer infrastructure 12 includes a computing device 14, a presence manager 50, a preference repository 45, and an external I/O device 28. The preference repository 45 may be any computing device 14 operable to process the preference information received from any number of a plurality of computing devices 14. The preference repository 45 may be a database or other storage system configured to store and communicate preference information relating to any number of a plurality of computing devices 14. Preference information may include, for example, user-determined activities that may be shared with other users. The presence manager 50 may be any known presence server configured and extended to enable features of this invention. The external I/O device may be any device configured to accept input from and/or transmit output to the computing device 14 through I/O interface 24.

In embodiments, the presence manager 50 and preference repository 45 may be provided and resident on a separate computer infrastructure 12 of, for example, a service provider. Additionally, as shown in FIG. 1, the presence manager 50 is in communication with the preference repository 45, as well as any number of a plurality of users 16 and participating ecosystem sites in a participant ecosystem.

The computing device 14 also includes a processor 20, memory 22A, an I/O interface 23, and a bus 25. The memory 22A can include local memory employed during actual execution of program code. Storage 29, cache memories, and storage system 22B can provide temporary storage of at least some program code in order to reduce the number of times code must be retrieved from bulk storage during execution. In addition, the computing device 14 includes random access memory (RAM) 26, a read-only memory (ROM) 27, and an operating system (O/S).

The computing device 14 is in communication with the external I/O device/resource 28 and the storage system 22B.

The external I/O device/resource 28 may comprise any device that enables an individual to interact with the computing device 14 or any device that enables the computing device 14 to communicate with one or more other computing devices 14 using any type of communications link. The external I/O device/resource 28 may be, for example, a handheld device, PDA, handset, keyboard etc.

In general, the processor 20 executes computer program code (e.g., program code logic), which can be stored in the memory 22A and/or storage system 22B. Moreover, in accordance with aspects of the invention, the program code having program code logic communicates with the presence manager 50. While executing the computer program code, the processor 20 can read and/or write data to/from memory 22A, storage system 22B, and/or I/O interface 24. The program code executes the processes of the invention. The bus 25 provides a communications link between each of the components in the computing device 14.

The computing device 14 may comprise any general purpose computing article of manufacture capable of executing computer program code installed thereon (e.g., a personal computer, server, etc.). However, it is understood that the computing device 14 is only representative of various possible equivalent computing devices 14 that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computing infrastructures for implementing the invention. For example, in embodiments, the computing infrastructure 12 comprises two or more computing devices 14 (e.g., a server cluster) that communicate over any type of communications link, such as a network, a shared memory, or the like, to perform the processes described herein. Further, while performing the processes described herein, one or more computing devices 14 on the computing infrastructure 12 can communicate with one or more other computing devices 14 external to the computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

The environment 10 also includes a participating ecosystem (shared session application set) 220 which may contain any of a plurality of participating ecosystem sites 225. Each participating ecosystem site 225 may in turn comprise any of a plurality of applications 65, each with an application profile 68. Additionally, the invention includes a user application list 70, and a media interaction list 75, both of which may be stored in storage system 22B in computing infrastructure 12. The shared application set 60 groups any number of a plurality of disconnected applications 65, which users 16 may access. Each application 65 comprises an application profile 68, which contains identifying information about the application 65. The presence manager 50 is configured to access this application profile 68 in order to identify the application 65.

The user application list 70 comprises a list of applications 65 that the user 16 used or is currently using. The media interaction list 75 comprises a list of media that the user is or has recently accessed.

In embodiments, the application profile 68 allows applications 65 to register a profile with the presence manager 50 to enable it to serve as a client to the presence manager 50.

The shared session application set 60 groups a set of disconnected applications 65 to enable them to share user 16 activity and/or session information between the applications 65 to enable a federated session experience across the application set 60. In embodiments, the usage of applications 65 by user 16 may include the type of activity the user is conducting, such as, for example, browsing news websites, shopping online, interacting with others, etc. In embodiments, in addition to the specific title of the media, the media interaction list 75 may also include a media type such as, for example, a song, album, video clip, television show, movie, etc. In embodiments, the media interaction list 75 may also include the type of interaction the user 16 is conducting, such as, for example, previewing, online viewing, downloading, etc.

In embodiments, the invention exposes the extension of existing presence information to registered and approved users 16 in order to communicate information about the specific media, products and services with which any number of a plurality of other users 16 are interacting in order to offer enriched cross sell opportunities. In further embodiments, the invention securely exposes the extended presence information as a fee-based service to approved applications to leverage the online activities of users and their friends in order to enhance the online experience. In this way, the system and method of the present invention can be offered as a revenue generating service.

In embodiments, the invention provides a business method that performs the steps of the invention on a subscription, advertising, and/or fee basis. That is, a service provider, such as a solution integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

EXEMPLARY ARCHITECTURE

Figure 2:
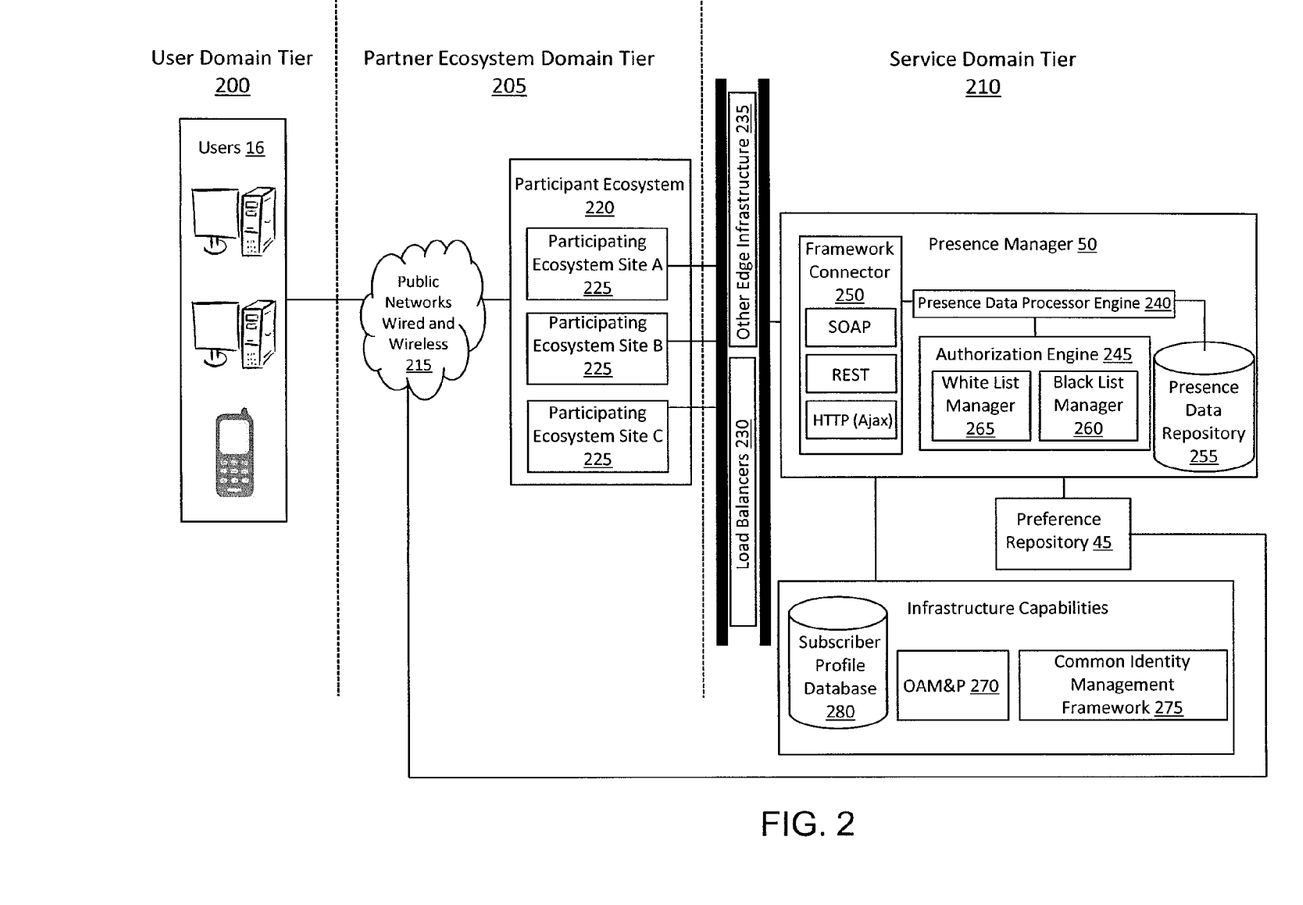
FIG. 2 shows an exemplary depiction of an overall architecture in accordance with aspects of the invention.

FIG. 2 shows an exemplary architecture in accordance with aspects of the invention. In particular, FIG. 2 shows three players: a User Domain Tier 200, a Partner Ecosystem Domain Tier 205, and a Service Domain Tier 210. The User Domain Tier 200 can include any number of users 16 using any number of different network elements such as, for example, a client computer and/or a mobile device. The User Domain Tier 200 also includes a browser, which communicates via any combination of wired and/or wireless links, or public networks wired and wireless 215, with the preference repository 45 in the Service Domain Tier 210, as well as with participant ecosystem sites 225 comprising the participant ecosystem 220 in the Partner Ecosystem Domain Tier 205. In embodiments, the preference manager 45 can store the preferences (rules) of users 16, which may include, for example, the types of the user's activities in the participant ecosystem 220 that may be publicized to other participating ecosystem sites 225 in the same participant ecosystem 220. The browser may be equivalent to the external I/O device/resource 28 of FIG. 1.

The Partner Ecosystem Domain Tier 205 may contain any number of a plurality of participating ecosystem sites 225 comprising any number of a plurality of participant ecosystems 220. The participating ecosystem sites 225 also include browsers, which communicate with the presence manager 50 in the Service Domain Tier 210. In embodiments, this communication may be conducted through load balancers 230 and/or other EDGE Infrastructures 235. The load balancers 230 can be for, for example, IP sprayers, which are configured to handle multiple requests. In embodiments, the preference manager 45 is configured to store the preferences (rules) of each participating ecosystem site 225. These preferences may include, for example, the types of activities conducted by users 16 on other participating ecosystem sites 225 belonging to the same participant ecosystem 220. In embodiments, these activities include those that may be shared with other participating ecosystem sites 225 belonging to the same participant ecosystem 220, according to the preferences of the users 16.

As further shown in FIG. 2, the Service Domain Tier 210 includes the presence manager 50, which is comprised of a presence data processor engine 240, an authorization engine 245, a connector framework 250, and a presence data repository 255. The presence data processor engine 240, which acts as a context sensitive router of status information, is operable to communicate with the connector framework 250, authorization engine 245, and presence data repository 255 to enable aspects of the invention. For example, each time a notification is received from either a user 16 or participating ecosystem site 225, the presence data processor engine 240 processes the rules and preferences stored in the preference repository 45 in order to determine which participating ecosystem site 225, or plurality thereof, in a participant ecosystem 220 is authorized to access information relating to the user's activities.

The authorization engine 245 is comprised of a black list manager 260 and/or a white list manager 265, and is operable to determine which participating ecosystem site 225, or plurality thereof, in a participating ecosystem 220 may access eligible user 16 information stored in the presence data repository 225. In embodiments, the eligibility of such user 16 information will depend on the preference rules established by the user 16 and/or participating ecosystem site 225, or plurality thereof, which are members of the same participant ecosystem 220. In further embodiments, the eligibility of user 16 information will depend on the preference rules established by either the user 16 or the participating ecosystem site 225, or plurality thereof, which are members of the same participant ecosystem 220. In embodiments, the black list manager 260 and the white list manager 265 may contain rules and data to enable both the automated prohibition and automated authorization, respectively, of access to user 16 activities stored in the preference repository 45 and set during user 16 registration.

The connector framework 250 is operable to enable access to the presence manager 50 through, for example, SOAP, REST, HTTP, Ajax, etc., to enable the retrieval and delivery of data to and from the presence manager 50. The presence data repository 255 contains presence data, which may utilize available formats for the storage of presence data. These formats may include, for example, PIDF (Presence Information Data Format) and RPDI (Rich Presence Information Data). One ordinarily skilled in the art will recognize, however, that, as presence data storage technology advances to include other formats, the presence data repository 255 may be operable to utilize those new formats.

The presence manager 50 in the Service Domain Tier 210 is operable to support operations, administration, maintenance and provisioning (OAM&P) 270 services, a common identity management framework 275, and a user profile database 280. OAM&P 270 support maintains the network devices, such as, for example, user devices in the User Domain Tier 200 by setting up services in a centralized fashion. The user profile database 280 can be represented by storage system 22B and may contain user preference information. The common identity management framework 275 may be comprised of network elements that enable a collective infrastructure, such as, for example, authentication and authorization services as well as user 16 management.

EXEMPLARY PROCESSES

Figure 3:
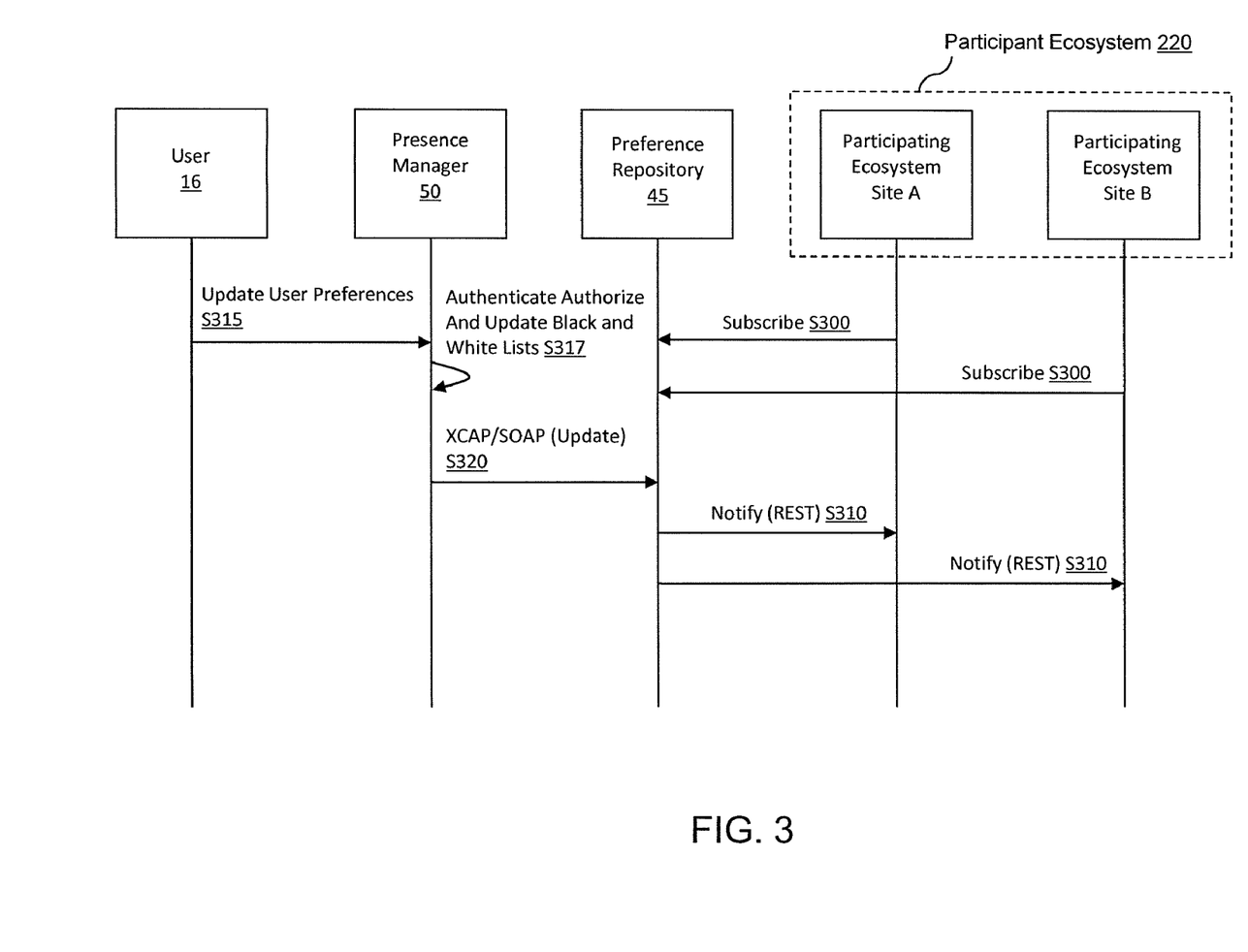
FIG. 3 is a swim lane diagram showing a process flow in accordance with aspects of the present invention.
Figure 4:
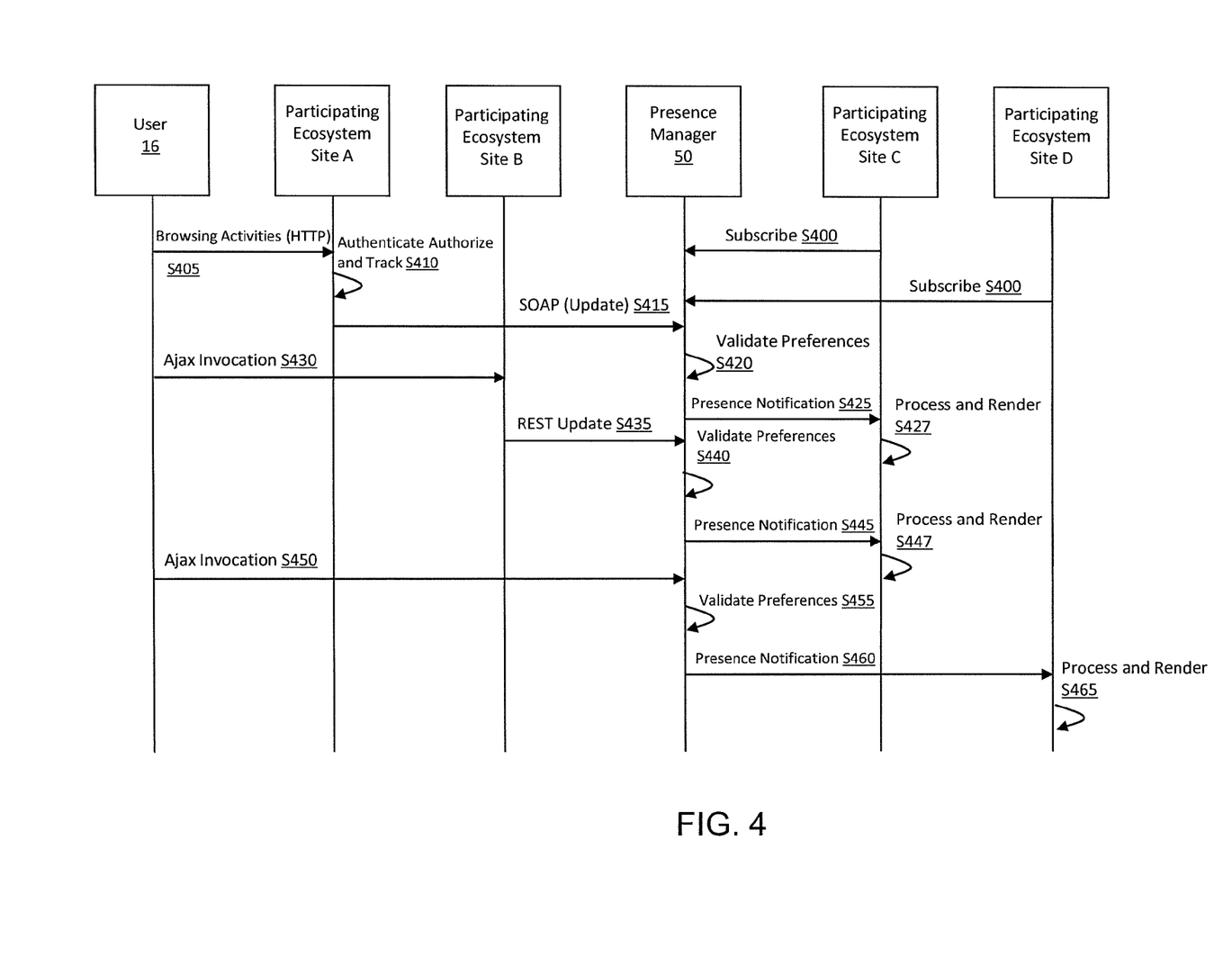
FIG. 4 is a swim lane diagram showing an exemplary process flow in accordance with aspects of the present invention.

FIGS. 3 and 4 show exemplary flows for performing aspects of the present invention. The steps of FIGS. 3 and 4 may be implemented in the environment of FIG. 1 or architecture of FIG. 2, for example. The flow diagrams may equally represent high-level block diagrams or swim-lane diagrams of the invention. The flowcharts and/or block diagram in FIGS. 3 and 4 illustrate the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1 and/or architecture of FIG. 2. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium, any of which are discussed here. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 3 is a swim lane diagram showing the provisioning and registration process in accordance with aspects of the present invention. Specifically, FIG. 3 comprises five participants: any of a plurality of users 16, a user presence manager 50, a preference repository 45, and a participant ecosystem 220 (which includes any number of a plurality of participating ecosystem sites 225). The participating ecosystem sites A and B may include any number of websites, which are registered to participate in the participant ecosystem. The preference repository may be any computer-usable or computer-readable medium, represented by, for example the storage system 22B as described above, and which is operable to receive and store preference information from and about any number of a plurality of participating ecosystem sites and/or users. The presence manager can be any computing device operable to process the preference information received from users. The users can subscribe using a computing device, or plurality thereof, that is capable of transmitting the user's preference information to the presence manager for processing and storage in preference repository.

At step S300, one or more participating ecosystem sites subscribe to be notified about session and status, e.g., presence, change information, and events of one or more users that the subscribing participating ecosystem sites determine may be relevant to other users. This subscription process involves transferring enough information to enable the presence manager to later determine, at step S317, what user activity in the participating ecosystem the presence manager should transfer to that participating ecosystem site once it has been successfully registered.

At Step S310, the preference repository acknowledges the subscription request made by participating ecosystem sites by sending an acknowledgment to the registering participating ecosystem site to indicate that the provisioning and registration of participating ecosystem site was successful. By way of non-limiting embodiments, such acknowledgements can be accomplished by way of a REST notification as shown in FIG. 3.

In non-limiting embodiments, one or more registered participating ecosystem sites may, through the registration process, ask to be notified when a certain condition or set of conditions relating to the activities of any number of a plurality of users occurs. For example, participating ecosystem sites can specify during the registration process to be notified only when any of the users accesses certain resources, such as, for example, a website, set of websites, or other content or category of content, or any combination thereof. Such notification may include information about which users satisfy the conditions that the participating ecosystem site specified during registration, as well as the nature of such access.

In further aspects of the invention, at step S315, any of a plurality of users register with the presence manager. The registration involves the user's preferences for what information about its activities it would like to be made public. In embodiments, the presence manager may be accessed through a website, web interface or other method of communication by either a computing device, mobile phone, or other device capable of transmitting information sufficient to establish preferences of the user.

In further embodiments, at step S315, during registration of any of a plurality of users, the user may specify which participating ecosystem site, or plurality thereof, are allowed to receive notification about its activities. That is, in embodiments, a registering user may specify which types of its activities it wishes to make available to participating ecosystem sites and their other users. In embodiments, a registering user may specify which participating ecosystem site and/or other user will be placed on a black list and/or white list. Those entities on a user's black list are automatically denied access to the presence information of that particular user. Those entities on a user's white list are automatically granted access to the presence information of that particular user.

Upon receipt of the user's preferences, the presence manager, at step S317, validates the preferences of the participating ecosystem sites that have registered their preference information. At step S320, upon validation, the presence manager updates the preference repository. Any number of a plurality of participating ecosystem sites that have registered to be notified about a particular type of user activity taking place at any number of a plurality of other participating ecosystem sites (which are also members of the same participant ecosystem) may now be have access to any user activity of this specified type.

In further aspects of the invention, any number of a plurality of participating ecosystem sites may need to be notified of changes to the preference subset of any number of a plurality of users. By way of a non-limiting example, such notification may occur at step S320. In embodiments, such update notification may be dynamically pushed from the presence manager to the preference repository when there is any change in any preference subset for any number of a plurality of users. In further embodiments, such update notification may be pulled by preference repository from the presence manager on a predetermined schedule.

FIG. 4 is a swim lane diagram showing an exemplary call flow that depicts a possible flow during the runtime operation of the invention. Specifically, FIG. 4 comprises six participants: participant ecosystem site A, site B, site C and site D, a plurality of users, and a presence manager.

In step S400 of the exemplary flow shown in FIG. 4, participating ecosystem sites C and D register with the presence manager in order to be notified about specific user activity. In embodiments, participating ecosystem sites C and D can request notification from the presence manager about specific user activity taking place on other participating ecosystem sites that are members of the same participant ecosystem. In this example, at step S405, the user accesses any number of a plurality of participating ecosystem sites such as, for example, participating ecosystem site A. At step S410, the accessed participating ecosystem site A performs authentication, authorization and tracking functions. At step S415, participating ecosystem site A sends a SOAP-based notification of the user's activity, which participating ecosystem site A has tracked, to the presence manager.

Upon receipt of the notification, the presence manager, at step S420, validates the preferences of the participating ecosystem sites that have registered their preference information. Upon validation, the presence manager sends notifications, at step S425, to any of a plurality of participating ecosystem sites that have registered to be notified about a particular user activity taking place at any number of a plurality of other participating ecosystem sites, which are members of the same participant ecosystem. In the exemplary case illustrated in FIG. 4, participating ecosystem site C is one such participating ecosystem site that registered to be notified about the particular kind of user activity. As such, participating ecosystem site C is one participating ecosystem site that may receive information about the activity of the user. Once participating ecosystem site C receives the information, it may then choose, at step S427, to share this information with other interested users on its site.

At step S430, the web browser of the user makes a direct Ajax-based call to participating ecosystem site B. Participating ecosystem site B, in turn, sends a REST-based notification to the presence manager at step S435. At step S440, the presence manager, processes the request and determines, based on participating ecosystem site C's preferences at registration that participating ecosystem site C also should be informed of the activity of the user. In embodiments, participating ecosystem site C, much like any other participating ecosystem site, may, at any time after registration, modify the preferences that specify the type of user activity taking place on any number of a plurality of other participating ecosystem sites in the same ecosystem that may be permissibly tracked. At step S445, the presence manager sends a notification to participating ecosystem site C of the user's activity on participating ecosystem site B. Participating ecosystem site C receives the information and, at step S447, decides whether to render this information to users on its site that are determined to be interested parties.

At step S450, the web browser of users makes an Ajax call directly to the presence manager. The presence manager receives the information and, at step S455, determines that participating ecosystem site D needs to be notified of the user activity taking place on any participating ecosystem site that is a member of the same participant ecosystem. In embodiments, this determination is based on the preference settings established at time of registration of participating ecosystem site D and/or the user. In embodiments, this determination may be based on the preference settings established at time of registration of only participating ecosystem site D. In embodiments, preferences for participating ecosystem sites and users may be determined at registration or at any point thereafter. Once the presence manager determines that participating ecosystem site D needs to be notified of the user activity, the presence manager, at step S460, sends a presence notification to participating ecosystem site D of this activity. Upon receiving the notification of the user's activity, participating ecosystem site D in turn decides, at step S465 whether or not to render this information to the relevant users on its site.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving preferences of one or more users, wherein the preferences comprise types of user activities that are performed by the one or more users on one or more participating ecosystem sites that are authorized to be publicized to other participating ecosystem sites in a same participant ecosystem;
   receiving preferences of each of the one or more participating ecosystem sites, wherein the preferences comprise the types of user activities that each of the one or more participating ecosystem sites are interested in being notified of and predetermined conditions or a set of predetermined conditions relating to the user activities that must be met prior to sending a notification of the user activity to the one or more participating ecosystem sites;
   a presence manager server receiving a notification of user activity of the one or more users taking place on the one or more participating ecosystem sites in the participant ecosystem;
   processing the user activity of the one or more users based on the preferences of the one or more users and the one or more participating ecosystem sites, wherein the processing comprises:
      determining that the user activity has been authorized by the one or more users as a publicizable activity; and
      determining that at least one of the one or more participating ecosystem sites has a preference to be notified about the user activity; and
   sending the notification of the user activity of the one or more users from the presence manager server to the at least one of the one or more participating ecosystem sites that has the preference to be notified about the user activity to enable the at least one of the one or more participating ecosystem sites to communicate information about the user activity to one or more users on the at least one of the one or more participating ecosystem sites,
   wherein the presence manager server receiving the notification of the user activity of the one or more users comprises the presence manager server attaining a comprehensive awareness of the one or more users on the one or more participating ecosystem sites by determining a status and availability of the one or more users on the one or more participating ecosystem sites.

2. The method of claim 1, wherein a preference repository receives registration information and the preferences from the one or more participating ecosystem sites in the participant ecosystem, and
   the preference repository provisions and stores the registration and the preferences received from the one or more participating ecosystem sites in the participant ecosystem.

3. The method of claim 1, wherein the preference repository sends a notification to the one or more participating ecosystem sites acknowledging successful registration.

4. The method of claim 1, wherein the presence manager server receives the preferences of a user from the one or more users.

5. The method of claim 4, wherein the presence manager server notifies the one or more participating ecosystem sites of the preferences received from the one or more users.

6. The method of claim 4, wherein the preferences of the one or more users include information about which types of the user activities are sent to the one or more participating ecosystem sites.

7. The method of claim 4, wherein the processing the user activity further comprises determining whether a request for the user activity includes information about one or more activities that is sent to the one or more participating ecosystem sites in accordance with the preferences of the one or more users,
 the user activity includes one or more application and content types that the one or more users are either accessing or have accessed on the one or more participating ecosystem sites, and
 information about the user activity comprises a user application list and a media interaction list.

8. The method of claim 7, wherein the user application list and the media interaction list include a list of applications and a list of all media, respectively, that the one or more users either are using or have accessed.

9. The method of claim 7, wherein the participating ecosystem sites communicate, to the one or more users, information about any number of specific media, products and/or services based on the information about the user activity of any of the one or more users.

10. The method of claim 1, wherein the steps of claim 1 are provided on a computing infrastructure, which is at least one of maintained, deployed, created and supported by a service provider on a fee or subscription basis.

11. A system for enabling the federation of rich content sessions comprising:
 a CPU, a computer readable memory and a computer readable storage media;
 a preference repository being operable to:
  receive registration and preference information of one or more users, the preference information comprising authorization information about types of user activities that are performed by the one or more users on one or more participating ecosystem sites that are to be publicized to other participating ecosystem sites in a same participant ecosystem; and
  receive preference information of one or more participating ecosystem sites, the preference information comprising the types of user activities that each of the one or more participating ecosystem sites are interested in being notified of and predetermined conditions or a set of predetermined conditions relating to the user activities that must be met prior to sending a notification of the user activity to the one or more participating ecosystem sites;
 a presence manager server being operable to:
  receive from the one or more participating ecosystem sites in the participant ecosystem a notification of user activity of the one or more users taking place on the one or more participating ecosystem sites;
  process the user activity based on the preference information of the one or more users and the one or more participating ecosystem sites, wherein the processing comprises:
   determining that the user activity has been authorized by the one or more users as a notifiable activity; and
   determining that at least one of the one or more participating ecosystem sites has submitted a preference to be notified about the user activity; and
  send the notification of the user activity to the at least one of the one or more participating ecosystem sites in the participant ecosystem to enable the at least one of the one or more participating ecosystem sites to communicate the user activity to one or more users on the at least one of the one or more participating ecosystem sites,
 wherein the presence manager server receiving the notification of the user activity of the one or more users comprises the presence manager server attaining a comprehensive awareness of the one or more users on the one or more participating ecosystem sites by determining a session status and availability of the one or more users on the one or more participating ecosystem sites.

12. The system of claim 11, wherein the preference information of the one or more users includes information about which types of the user activities are sent to the one or more participating ecosystem sites.

13. The system of claim 11, wherein the processing of the user activity further comprises determining whether a user activity request includes the user activity information that is sent to the one or more participating ecosystem sites in accordance with the preferences of the one or more users.

14. The system of claim 11, wherein the user activity information includes one or more application and content types on the one or more participating ecosystem sites that the one or more users either is accessing or has accessed.

15. The system of claim 14, wherein the user activity information comprises a user application list and a media interaction list.

16. The system of claim 15, wherein the user application list and the media interaction list include a list of applications and a list of all media, respectively, that the one or more users either is accessing or has accessed.

17. The system of claim 16, wherein information about any number of specific media, products and/or services are communicated to the one or more users based on the activity information of the one or more users.

18. The system of claim 11, wherein the system is operable to communicate the user activity information to any number of a plurality of other users who have also registered with the presence manager server.

19. A computer program product comprising a computer usable storage memory having readable program code tangibly embodied in the storage medium, the computer program product being operable to:
 receive registration and preference information of one or more users, the preference information comprising authorization information about types of user activities that are performed by the one or more users on one or more participating ecosystem sites that are to be publicized to other participating ecosystem sites in a same participant ecosystem;
 receive preference information of one or more participating ecosystem sites, the preference information comprising the types of user activities that each of the one or more participating ecosystem sites are interested in being notified of and predetermined conditions or a set of predetermined conditions relating to the user activities that must be met prior to sending a notification of the user activity to the one or more participating ecosystem sites;
 receive at a presence manager server a notification of user activity of the one or more users taking place on the one or more participating ecosystem sites from the one or more participating ecosystem sites in the participant ecosystem;
 process the user activity based on the preferences of the one or more users and the one or more participating ecosystem sites, wherein the processing comprises:
  determining that the user activity has been authorized by the one or more users as a notifiable activity; and determining that at least one of the one or more participating ecosystem sites has submitted a preference to be notified about the user activity; and send the notification of the user activity to the at least one the one or more participating ecosystem sites that have a preference to be notified about the user activity of the user taking place on the one or more participating ecosystem sites in the participant ecosystem to enable the at least one of the one or more participating ecosystem sites to communicate the user activity to a plurality of other users on the at least one of the one or more participating ecosystem sites, wherein the receiving the notification of the user activity of the one or more users comprises attaining a comprehensive awareness of the one or more users on the one or more participating ecosystem sites by determining a status and availability of the one or more users on the one or more participating ecosystem sites.

20. The computer program product of claim 19, wherein the participant ecosystem comprises a plurality of participating ecosystem sites and wherein each participating ecosystem site is operable to execute an application, each application containing an application profile that describes the application.

21. The system of claim 11, wherein the presence manager server is further operable to maintain a session of the one or more users with the at least one of the one or more participating ecosystem sites, wherein each of the participating ecosystem sites is operable to execute an application, each application containing an application profile that describes the application, and the session status and availability information is used by the at least one of the one or more participating ecosystem sites to synchronize related session activity with the one or more users and maintain the session of the one or more users.

* * * * *